United States Patent [19]
Currie

[11] Patent Number: 6,007,083
[45] Date of Patent: Dec. 28, 1999

[54] VELOCIPEDE DRIVE

[76] Inventor: Neil R. Currie, 1948 Coy Avenue, Saskatoon, Saskatchewan, Canada, S7M 0J1

[21] Appl. No.: 08/863,129

[22] Filed: May 27, 1997

[51] Int. Cl.$^6$ ........................................... B62M 1/04
[52] U.S. Cl. ............................................. 280/252
[58] Field of Search .................................. 280/241, 252, 280/253, 256, 257; 482/57

[56] References Cited

U.S. PATENT DOCUMENTS

| | | | |
|---|---|---|---|
| 5,236,211 | 8/1993 | Meguerditchian | 280/252 |
| 5,732,963 | 3/1998 | White | 280/252 |

*Primary Examiner*—Robert J. Oberleitner
*Assistant Examiner*—C. T. Bartz

*Attorney, Agent, or Firm*—Murray E. Thrift; Adrian D. Battison

[57] ABSTRACT

The present invention provides a human powered velocipede drive providing rotary output. The velocipede drive is mounted on a bicycle to provide rotational movement to a front drive wheel of the bicycle thereby propelling the bicycle over the ground. The velocipede drive comprises a seat mounted on the bicycle, a slider guide mounted on the hub of the front wheel, a slider mounted on the slider guide for movement thereover, foot pedals fixed on the slider, a rotatably mounted driven member mounted on the hub of the drive wheel, an elongate flexible drive member for imparting forward rotational movement to the driven member when moved from a retracted position to an extended position, and biasing means for biasing the elongate flexible member in the retracted position.

18 Claims, 12 Drawing Sheets

6,007,083

VELOCIPEDE DRIVE

FIELD OF THE INVENTION

The present invention provides a human powered drive providing rotary output, particularly of the type for use with a bicycle or other conveyance.

SUMMARY

According to one aspect of the present invention there is provided a rotary output drive powered by the legs of a person comprising:

a seat arranged to support the person;

a slider guide positioned forwards of the seat at a substantially constant distance therefrom;

a slider mounted on the slider guide for sliding movement thereon between a rearwardmost position and a forwardmost position;

foot pedals fixed to the slider for movement therewith;

a rotatable driven member;

an elongate drive member being fixed to the slider for movement therewith and extending over at least a portion of an outer surface of the driven member such that contact between the elongate drive member and the driven member causes rotational movement of the driven member in response to translation of the drive member, said rotational movement being in a first rotational direction when the elongate flexible drive member moves from a retracted position with the slider means in the rearwardmost position to an extended position with the slider means in a forwardmost position, and said rotational movement being in a second direction opposite to the first direction when the elongate drive member moves from an extended position with the slider means in the forwardmost position to an retracted position with the slider means in a rearwardmost position;

biasing means for biasing the elongate flexible member towards the retracted position;

a rotary output member connected to a one-way clutch coupling the output member to the driven member for rotating the output member in response to rotation of the driven member in the first direction, and allowing the output member to free wheel in response to rotation of the driven member in the second direction;

whereby applying a forward force to the foot pedals with the legs moves the slider means from the rearwardmost position to the forwardmost position thus moving the elongate drive member from the retracted position to the extended position and rotating the output member;

and whereby applying a rearwards force to the foot pedals with the legs moves the slider means from the forwardmost position to the rearwardmost position thus moving the elongate flexible drive member from the extended position to the retracted position.

The drive may be used in many types of vehicles or systems such as a bicycle, a tricycle, a car, a boat, a submersible, or an aircraft. In a preferred embodiment the drive is configured for use with a bicycle.

BRIEF DESCRIPTION OF THE DRAWINGS

In the accompanying drawings, which illustrate an exemplary embodiment of the present invention.

DETAILED DESCRIPTION

Figure 1:
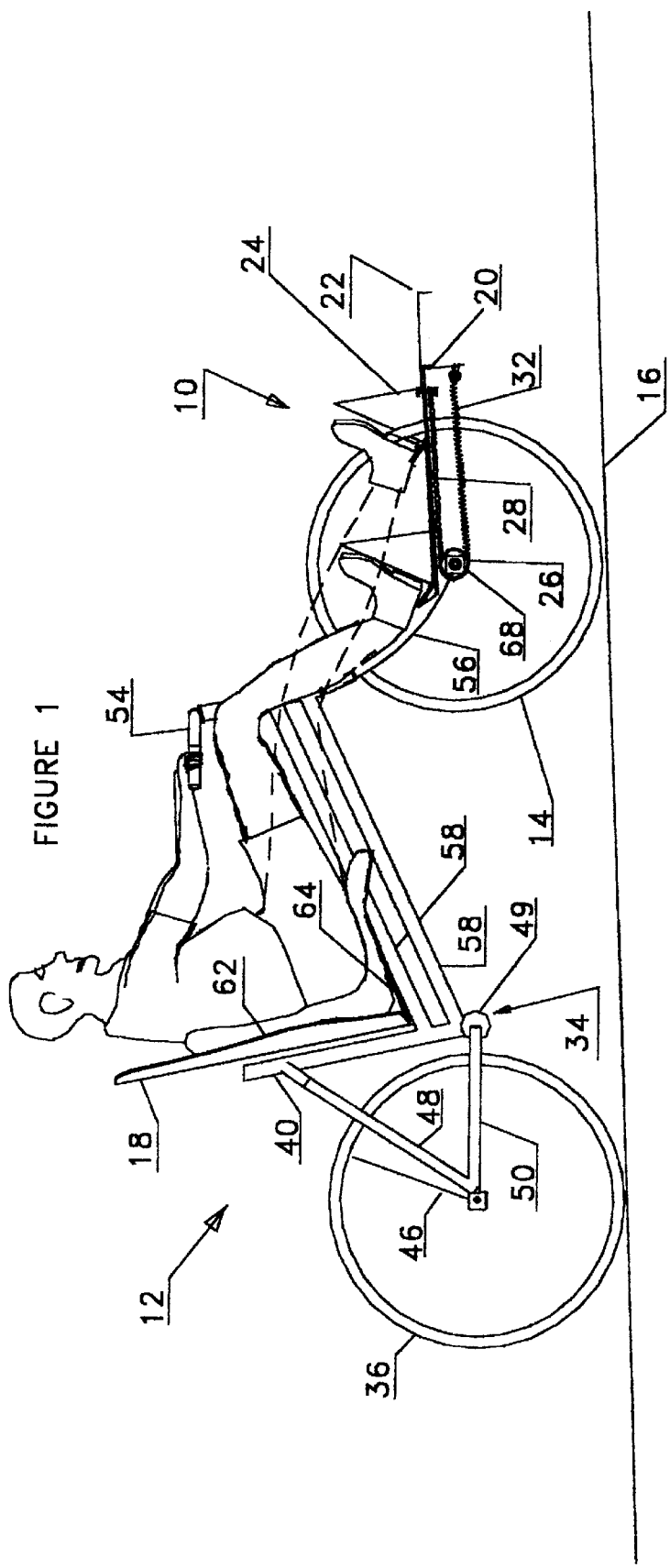
FIG. 1 is a side view of the velocipede drive mounted on a bicycle.
Figure 2:
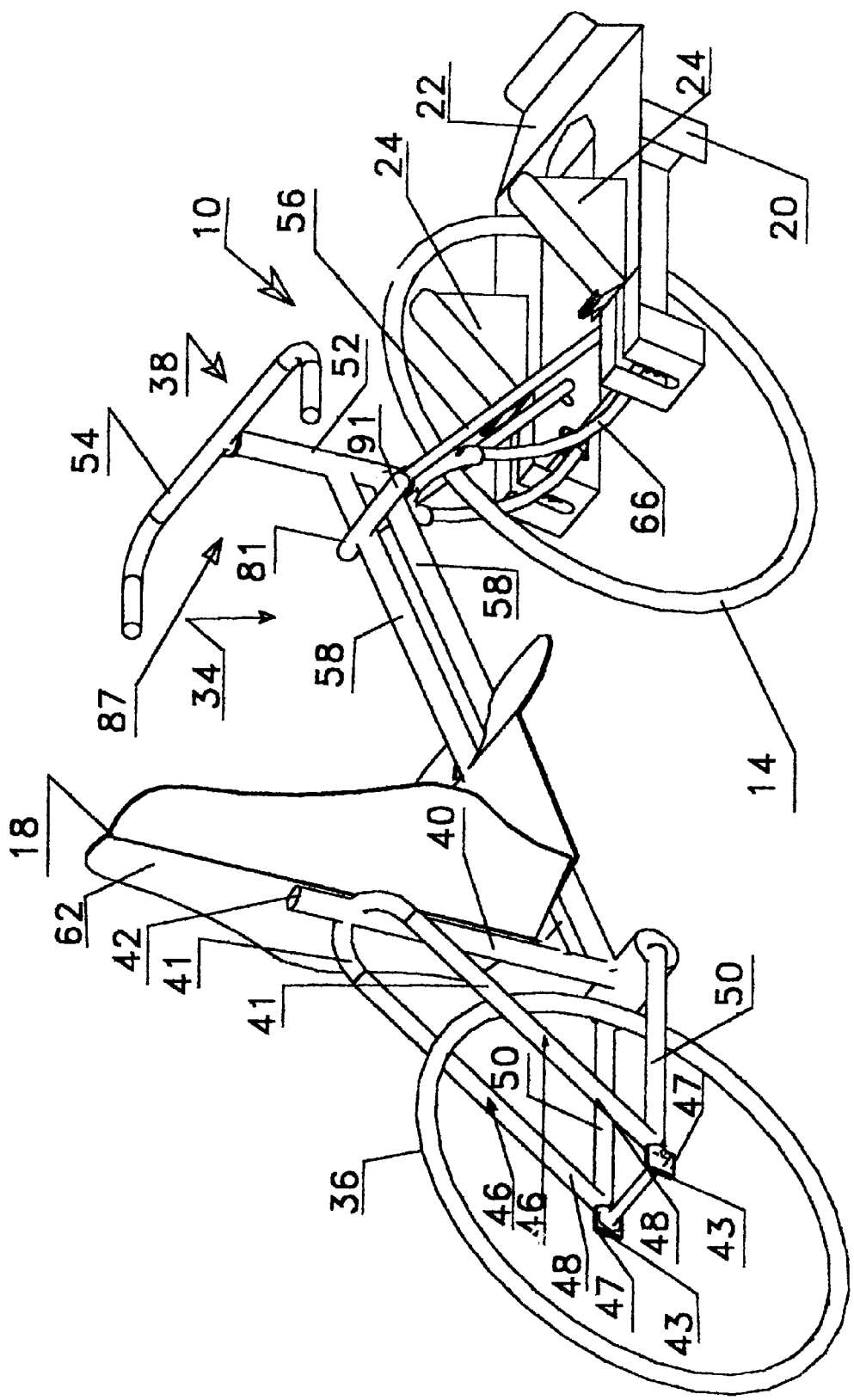
FIG. 2 is an isometric view of the velocipede drive mounted on a bicycle.

Referring to FIGS. 1 and 2, the velocipede drive is shown generally at 10. The velocipede drive 10 is mounted on a bicycle 12 to provide rotational movement to the front drive wheel 14 of the bicycle thereby propelling the bicycle 12 over the supporting surface 16. The velocipede drive 10 comprises a seat 18 mounted on the bicycle 12, a slider guide 20 mounted on the hub of the front wheel 14, a slider 22 mounted on the slider guide 20 for movement thereover, foot pedals 24 fixed on the slider 22, a rotatably mounted driven member 26 mounted on the hub of the drive wheel 14, an elongate flexible drive member 28 for imparting rotational movement to the driven member 26, and biasing means 32.

The bicycle 12 comprises a tubular frame 34, a front drive wheel 14, a rear wheel 36, and steering means 38. The bicycle frame 34 includes a substantially upright seat support member 40 extending from a top end 42 to a bottom end 44, and a pair of rear wheel supports 46 extending rearwards from the upright seat support 40. The rear wheel supports 46 are spaced apart and fixed to opposing sides of the upright seat support member 40.

The rear wheel supports 46 comprise a first member 48 extending from a top end 41 fixed to the top end 42 of the upright support member 40 downwards and rearwards to a bottom end 43 and a second member 50 extending from a front end 45 fixed to the bottom end 44 of the upright seat support 40 rearwards at a slight incline to a rear end 47 fixed to the bottom end 43 of the first member 48. A cross member 49 connects the bottom end 44 of the upright seat support to the front end 45 of the second member 50.

The first and second members 48 and 50 form a triangle with the upright support 40. The rear wheel 36 of the bicycle 12 is positioned between the two rear wheel supports 46 with the hub of the rear wheel 36 positioned at the junction of the first and second rear support members 48 and 50 and is rotatably coupled to it.

The bicycle frame 34 also includes an upright steering headset member 52 arranged forwards of the upright seat support member 40. The upright headset member 52 encloses a pivot connection connecting the handle bars 54 located at the top of the headset 52 and steering forks 56 which extend downwards from the headset 52. The front wheel 14 is mounted between the front forks 56 with the hub 68 of the front wheel 14 mounted between the ends of the front forks 56 as is normal for a standard bicycle 14. The front drive wheel 14 includes an axle 68 extending laterally through the hub 68 and through the front forks 56. This axle 68 supports the front forks 56 of the bicycle 14 and is employed to connect the front wheel 14 to the front forks 56.

The headset 52 is connected to the upright seat support 40 by a pair of frame members 58. The frame members 58 extend from a position adjacent the bottom 44 of the upright seat support 40 forwards and upwards to the upright headset member 52.

A substantially L-shaped seat member 18 having a backrest 62 and a seat portion 64 is mounted on the bicycle frame 14. The backrest 62 of the seat 18 is supported by the upright seat support 40 and the seat portion 64 of the seat 18 is supported on the frame members 58. The seat 18 is arranged much lower than on an ordinary bicycle such that the buttocks of a person sitting in the seat 18 are positioned slightly above the hubs of the front and rear wheels 14 and 36 and drive 10. The individual when sitting on the bicycle seat 18 sits with his/her legs extending forwards and engaging the velocipede drive 10 with his/her feet.

Unlike a conventional bicycle the rear wheel 36 is not the drive wheel and the bicycle 12 has no sprocket or chain extending to the rear wheel 36. Instead, unlike a conventional bicycle, the front wheel 14 is the drive wheel and includes a rotatably mounted driven member 26, usually a sprocket mounted on the hub 68. The sprocket 26 is arranged such that forward rotation of the sprocket 26 causes forward rotation of the wheel 14. A one way clutch allows the hub 68 to free-wheel when there is no forward motion of the sprocket 26 relative to the front wheel 14.

Figure 3:
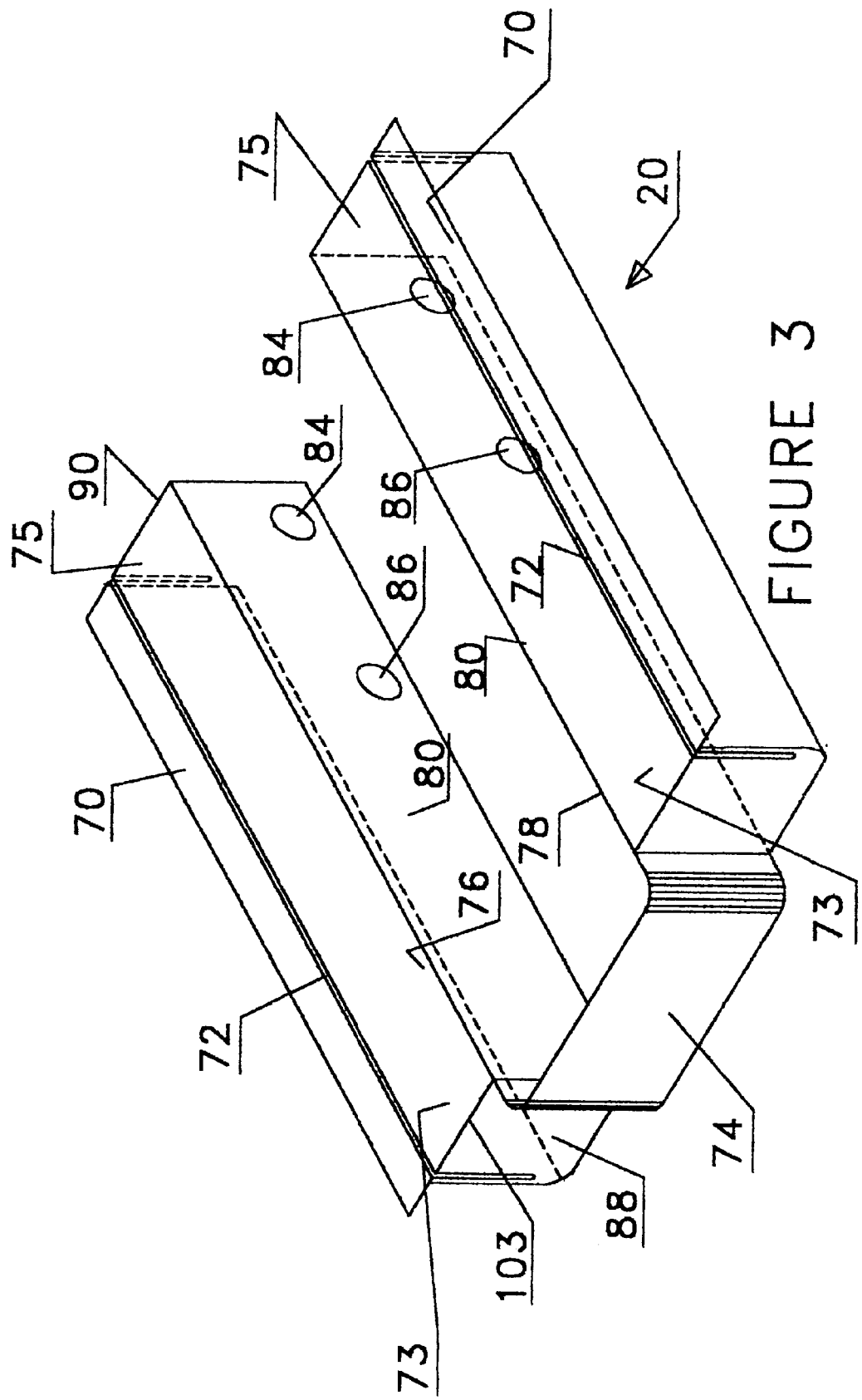
FIG. 3 is an isometric view of the slider guide.

Referring to FIGS. 1, 2, and 3 the slider guide 20 is mounted at the front of the bicycle 12 on the elongate axle 68 of the hub 68 of the front wheel 14. The slider guide 20 comprises a pair of spaced apart elongate plate members 70 arranged substantially parallel to each other and lying in a substantially horizontal plane. The elongate plate members 70 are spaced apart a distance such that they can be positioned to receive the front wheel 14 and forks 58 of the bicycle 14 between them.

Each of the elongate plate members 70 includes a slot shaped channel 72 extending longitudinally along the length of the plate member 70. The elongate plate members 70 are joined together near their respective front ends 73 by a connection member 74 extending between opposed sides 76 and 78 of the elongate members 70. Extending along each of the opposed sides 76 and 78 and downwards therefrom is an inner face plate 80. A hole 84 is located towards the rear end 75 of each of the inner face plates 80 such that the holes 84 are aligned with each other to cooperate to receive the elongate axle 68 of the hub 68 therethrough. Each end of the elongate axle 68 is positioned to extend through the aligned holes 84 thereby mounting the slider guide 20 on the front wheel 14 of the bicycle 12.

A second hole 86 is located at a position spaced forward of the hole 8 on each of the inner face members 80. Each second hole 86 is aligned with the second hole 86 on the opposing face member. The second holes 86 cooperate with the slider guide member support 87 to provide attachment points for the bottom end of the support 87.

Figure 4:
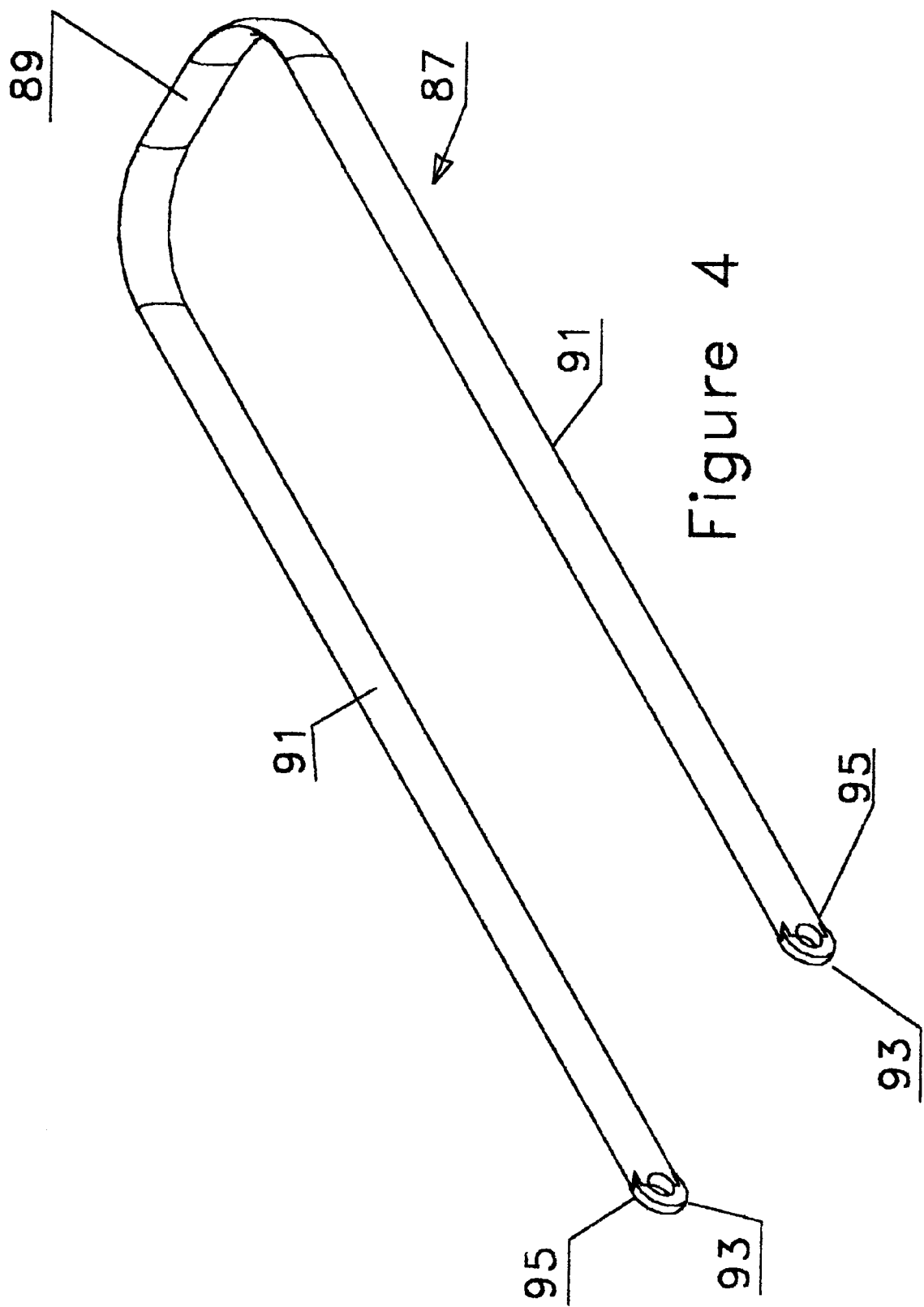
FIG. 4 is an isometric view of the slider guide support.

Referring to FIGS. 2, 3 and 4, the slider guide member support 87 is an elongate U-shaped member for supporting the slider guide 20. The slider guide member support 87 is arranged such that the base 89 of the U is positioned around the upright headset member 52 of the bicycle 12 above the frame members 58, with the arms 91 of the U extending downwards to respective ends 93 adjacent second holes 86 in the slider guide 20. The bottom end 93 of each respective arm 91 has a hole 95 arranged to cooperate with a respective one of the second holes 86 in the slider guide 20 to receive a fastener therethrough thereby fixing the slider guide member support 87 to the slider guide 20. The support 87 helps to prevent the front end of the slider guide 20 from being forced downwards when in use.

At the front and rear ends 73 and 75 of the elongate plate member 70 arranged on the side of the front wheel 14 having the sprocket 26 are end plates 88 and 90. The end plates 88 and 90 are located to the front and rear of the elongate plate members 70 respectively. The rear end plate 90 is arranged such that it extends downwards below the sprocket 26 providing a guard for the sprocket 26 to help protect an individual from injury by inadvertently coming into contact with the sprocket 26. The front end plate 88 provides a mounting point for the biasing means 32.

Figure 5:
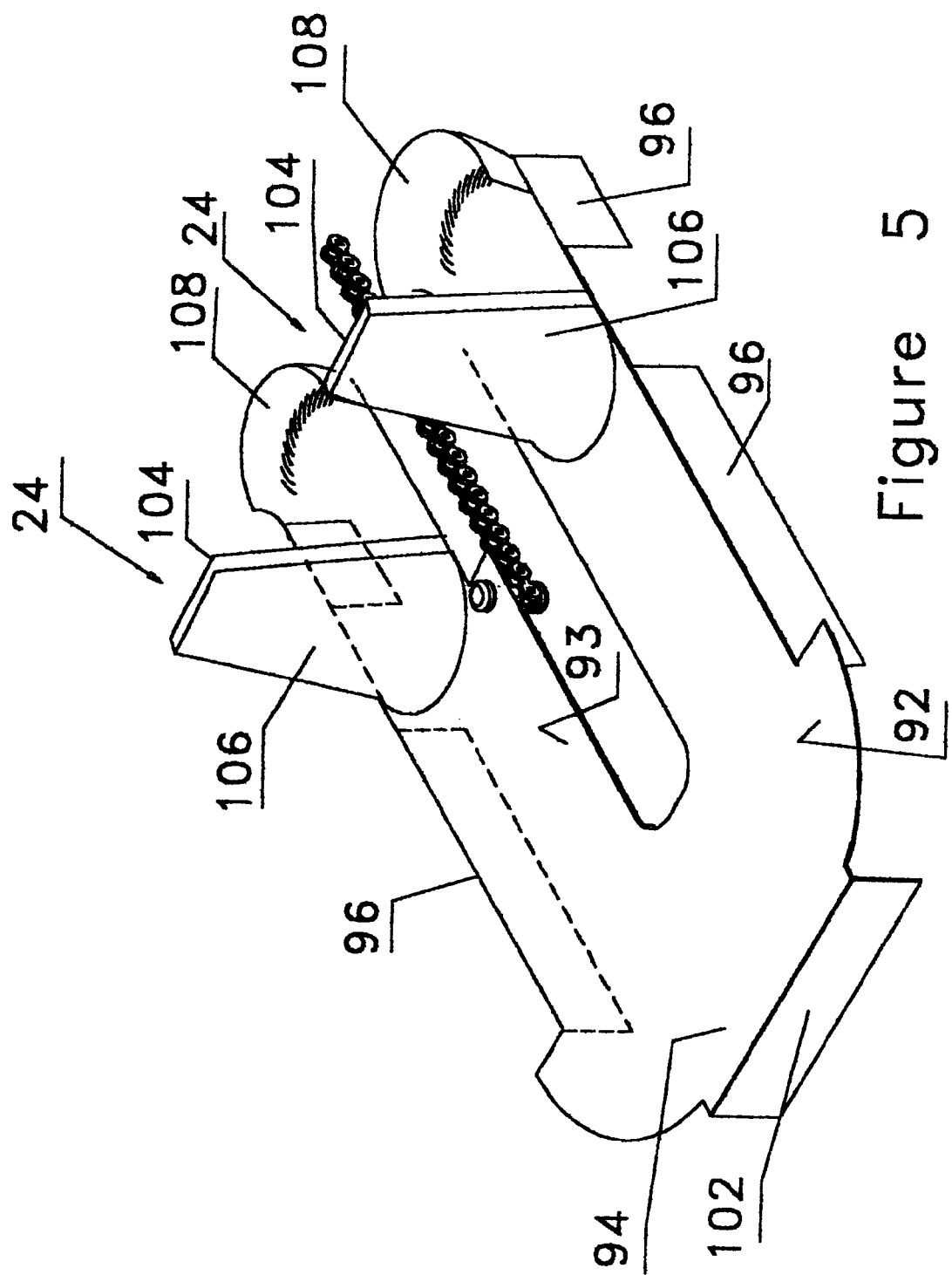
FIG. 5 is an isometric view of the slider.
Figure 6:
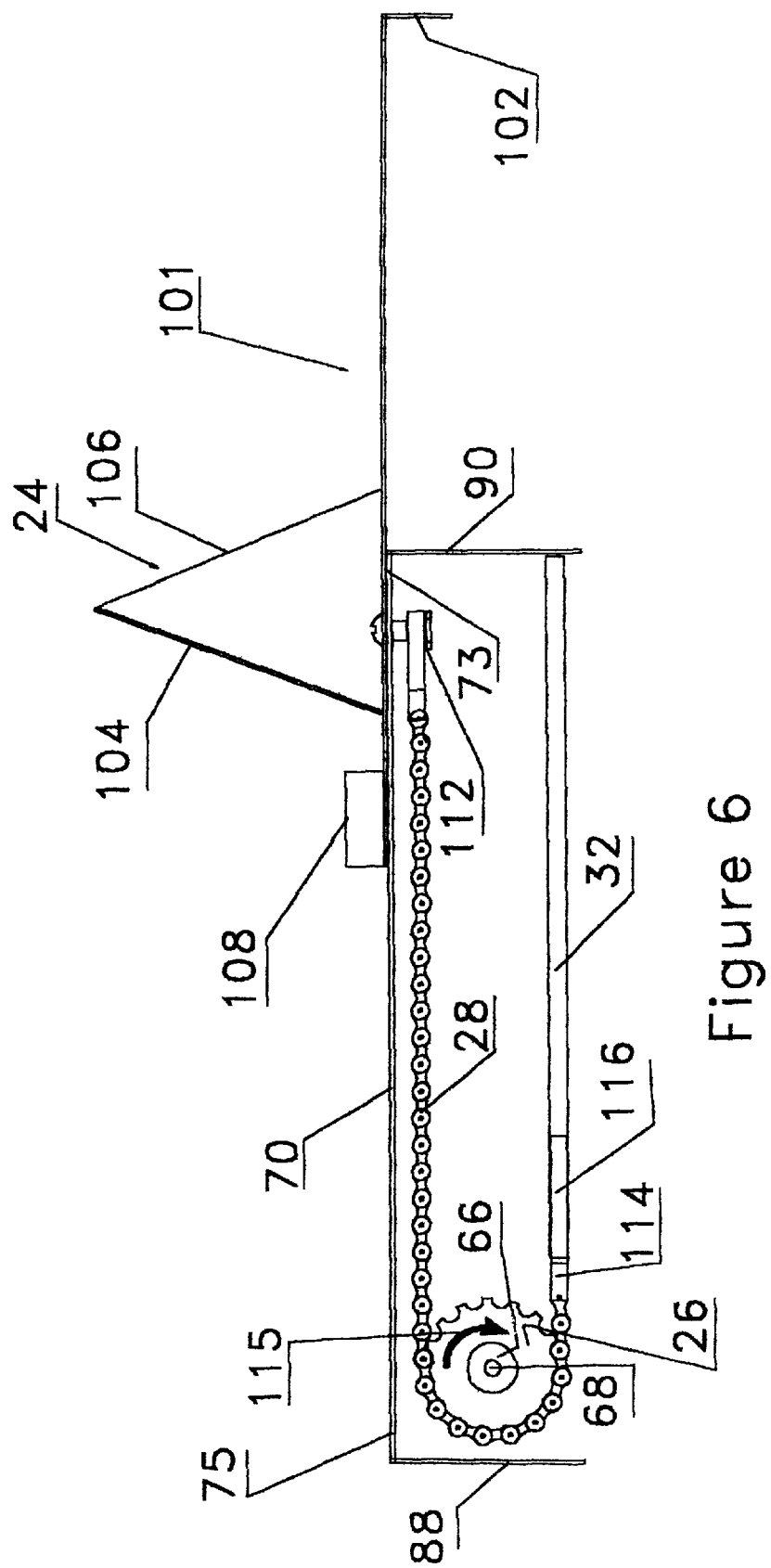
FIG. 6 is a side view of the slider in the forwardmost position showing the chain, sprocket, and elastic member.
Figure 7:
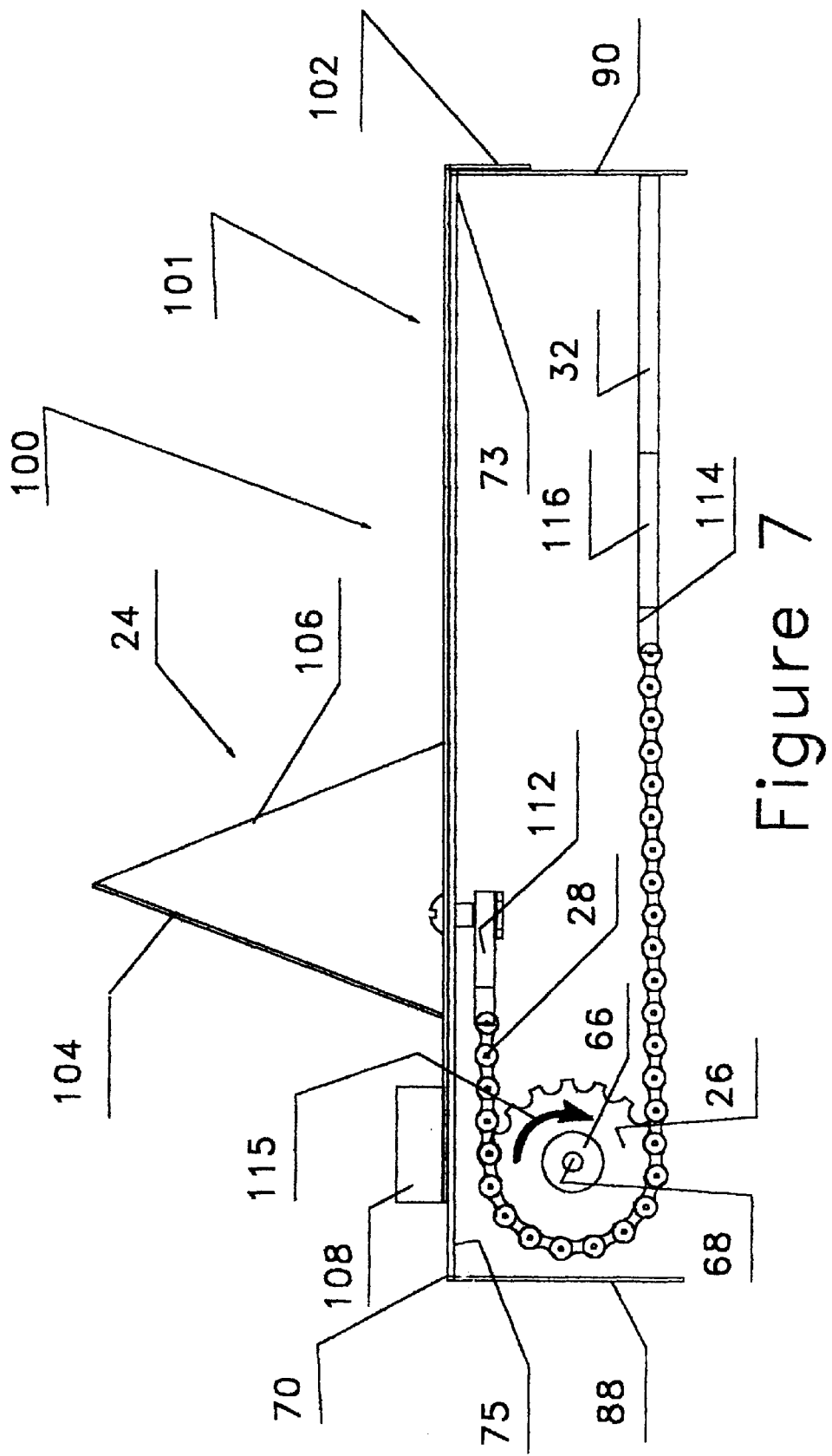
FIG. 7 is a side view of the slider in the rearwardmost position showing the chain, sprocket, and elastic member.
Figure 8:
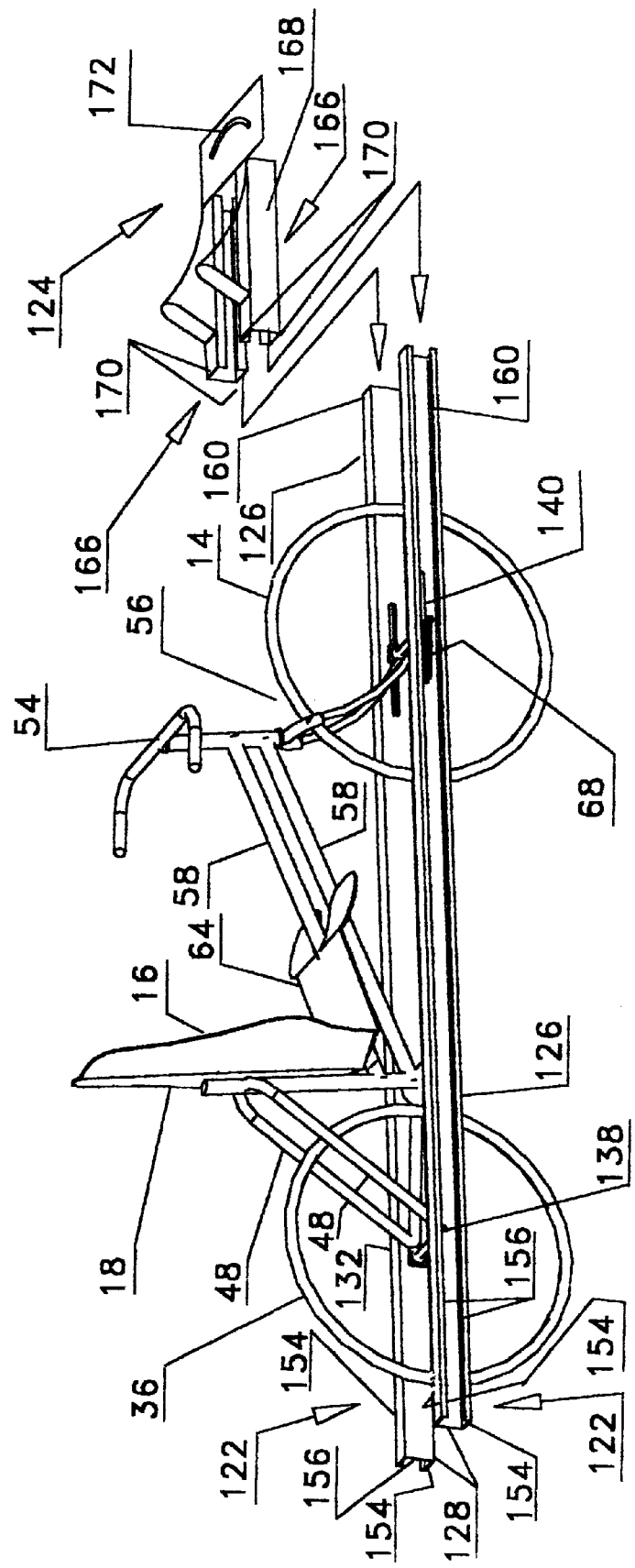
FIG. 8 is a side view of the alternative embodiment of the velocipede drive and bicycle.
Figure 9:
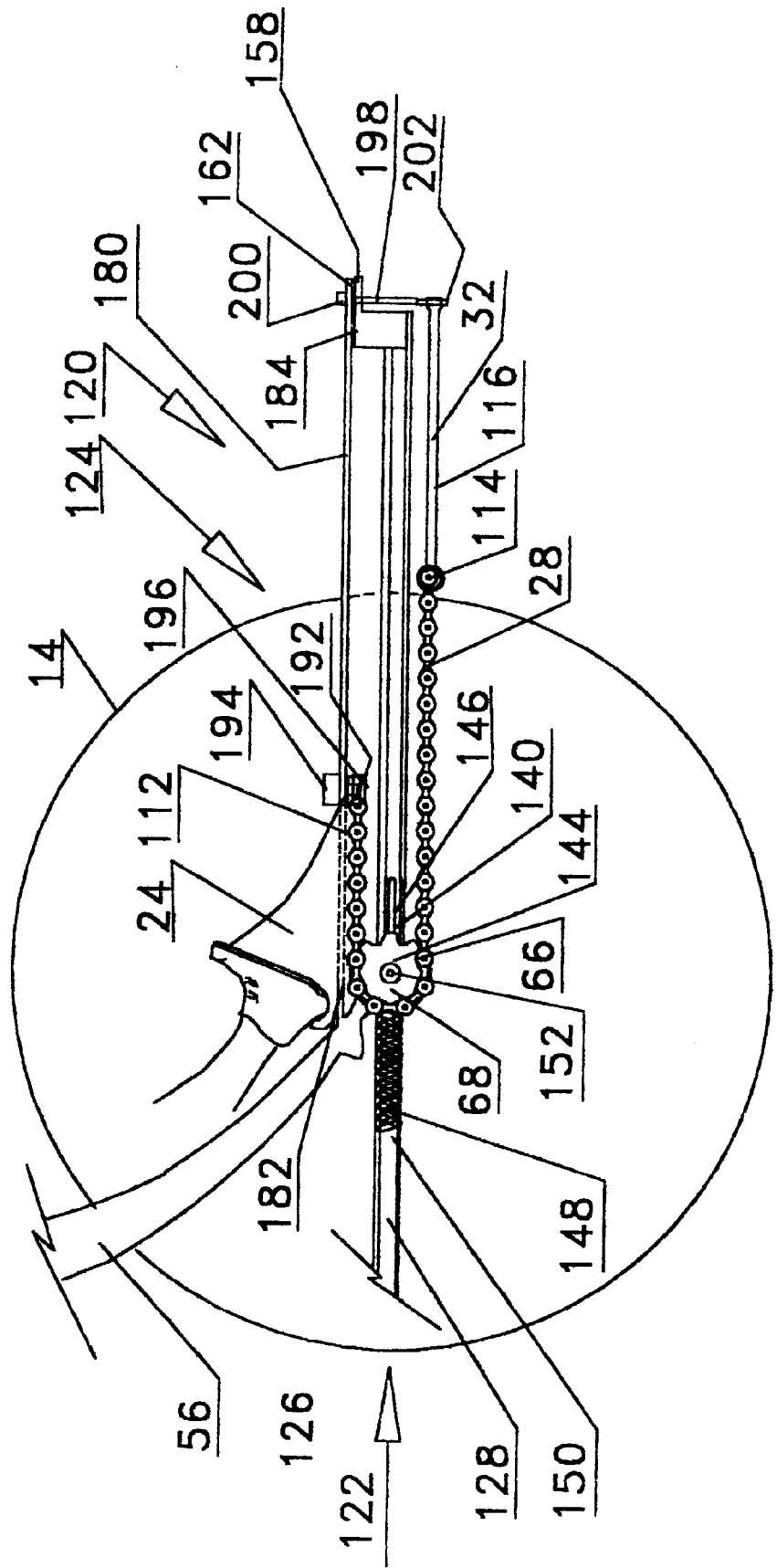
FIG. 9 is a side view of the alternative embodiment of the velocipede drive.
Figure 10:
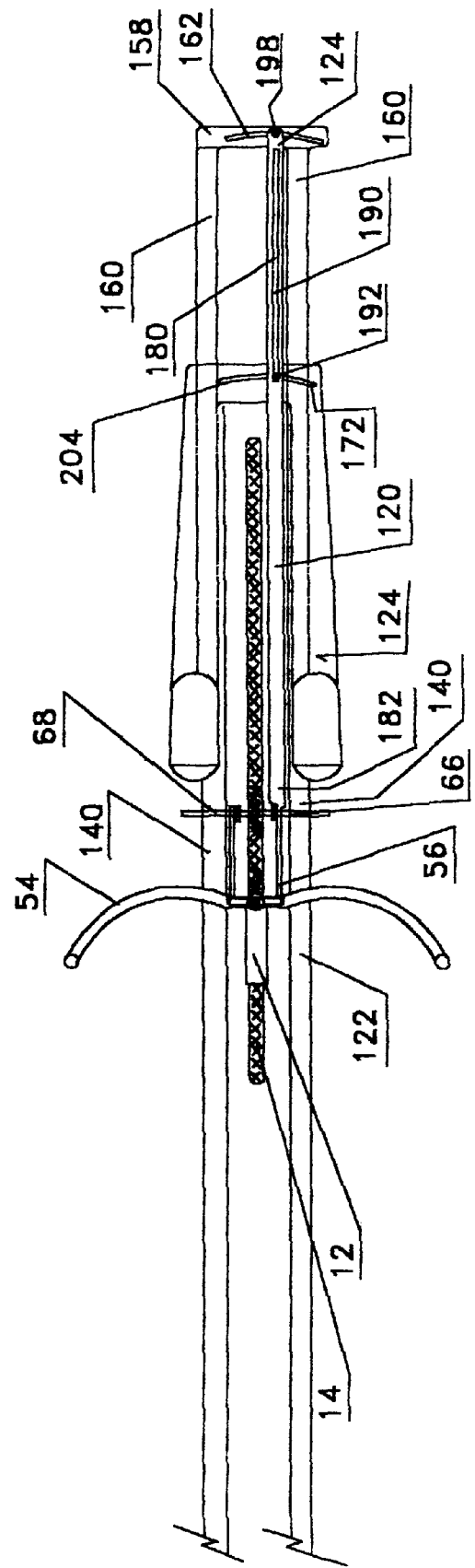
FIG. 10 is a top view of the alternative embodiment of the velocipede drive showing the alignment means in a position for straight ahead movement of the bicycle.
Figure 11:
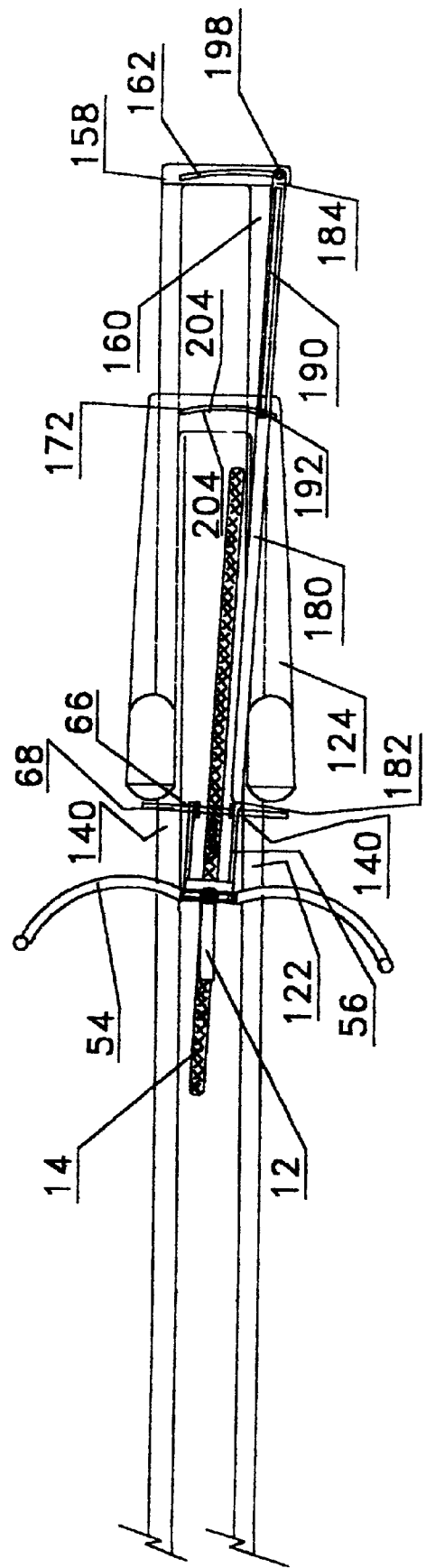
FIG. 11 is a top view of the alternative embodiment of the velocipede drive showing the alignment means in a position for turning the bicycle and the slider in the rearwardmost position.
Figure 12:
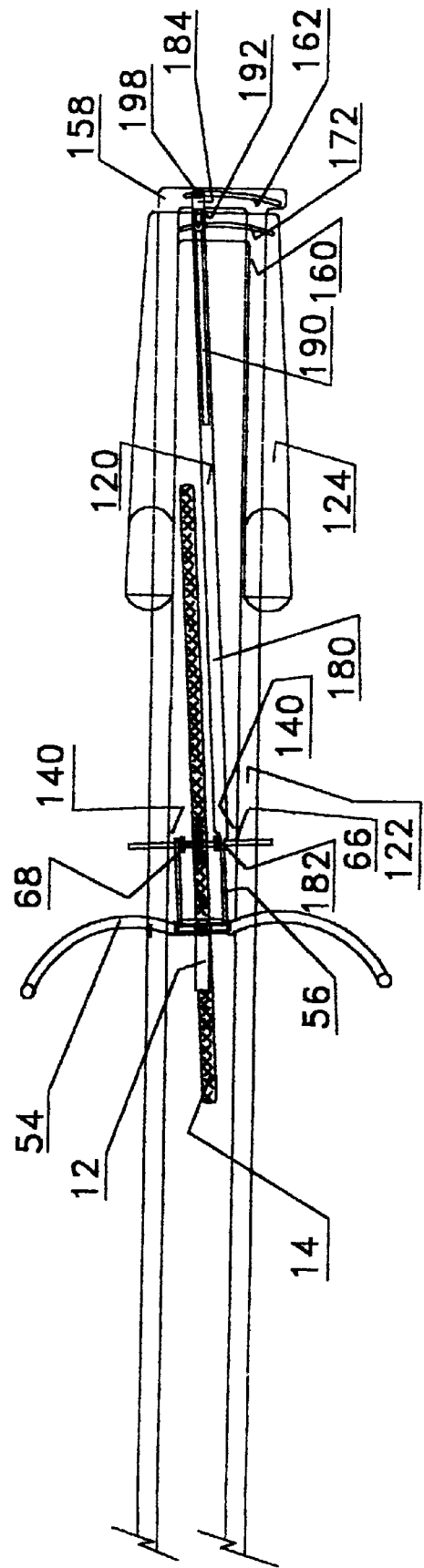
FIG. 12 is a top view of the alternative embodiment of the velocipede drive showing the alignment means in a position for turning the bicycle and the slider in the forwardmost position.

Referring to FIGS. 2 and 5, the slider 22 comprises a substantially U-shaped plate member having two elongate arms 92 and 93 spaced apart from one another and are arranged to align vertically with the plate members 70 of the slider guide 20. The arms 90 and 93 are also spaced apart approximately the same distance as the elongate plate members 70 of the slider guide 20. The base 94 of the U-shaped plate member extends between the two arms 92 and 93 and joins the arms 92 and 93 together forming the front of the slider 22.

Extending downwards from each of the elongate arm members 92 and 93 are a pair of runners 96. The runners 96 comprise flange members extending longitudinally along the edge of the arm members 92 and 93 and are fixed at their top ends to the bottom of the arm members 92 and 93. Each runner 96 is arranged on the slider 22 such that it will engage within the slot shaped channel 72 of a respective elongate plate member 70 of the slider guide 20. The slider 22 and runners 96 are arranged on the slider guide 20 such that the slider 22 may slide along the slider guide 20 between a rearmost position 100 and a forwardmost position 101. A stop member 102 is arranged on the front of the slider 22 extending downwards from the base 94 of the slider 22. The stop member 102 comprises a downwardly extending flange member and is sized and arranged to extend forwards of the slider guide 20 such that the stopper 102 will contact the front edge 103 of the slider guide 20 when the slider 22 is moved rearwards to the rearwardmost position 100 thereby stopping the slider 22 and preventing it from moving any further rearwards.

The foot pedals 24 are mounted on the top surface of each of the elongate arms 92 and 93 of the slider member 22. Each foot pedal 24 comprises an upwardly and forwardly extending plate member 104 and a support member 106 extending between the plate member 104 and the surface of each arm 92. The pedals 24 are sized and arranged for receiving the feet of the individual riding the bicycle.

A heel engaging member 108 is arranged at the end of each arm 92 of the slider 22 opposite the plate 104 of the foot pedal. The heel member 108 allows the heel of the individual to engage a portion of the slider 22 so that when drawing the feet rearwards the slider 22 is drawn along with the feet. Applying a forwardly directed force with the feet to the pedals 24 will cause the slider 22 to move in a forward direction between the rearwardmost position 100 and the forwardmost position 101. Applying a rearwardly directed force with the heels to the heel engagement members 108 will draw the slider 22 rearwardly between the forwardmost position 101 and the rearwardmost position 100.

Referring to FIGS. 1, 2, 6 and 7, the elongate flexible drive member 28 comprises a bicycle type chain fixed at a first end 112 to a bottom face of one of the arms 92 of the slider 22 and extends rearwardly therefrom over and around the sprocket 26 to a second end 114 at a position in front of the sprocket 26. A resilient biasing means 32, usually an elastic cord or spring, is connected at a first end 116 to the second end 114 of the bicycle chain 28 and extends therefrom to a second end 118 which is connected to the front end plate 90 of the slider guide 20. The resilient biasing means 32 keeps the chain 28 in contact with the sprocket 26 as the chain is moved between an extended position when the slider is in a forwardmost position 101 and retracted position when the slider 22 is in the rearwardmost position 100. The biasing means 32 also helps bias the slider 22 towards the rearwardmost position 100 enabling the individual riding the bicycle 12 to move the slider into the rearwardmost position 100 more easily and under more control.

The chain 28 is moved from the retracted position to the extended position as the slider 22 is moved from the rearwardmost position 100 to the forwardmost position 101. This causes the sprocket 26 to move in a forward direction 115 causing forward rotation of the sprocket 26 and thus forward rotation of the drive wheel 14 which results in forward movement of the bicycle 12. Movement of the slider 22 from the forwardmost position 101 to the rearwardmost position causes the sprocket 26 to rotate in a second direction relative to the hub and counter to the forward rotation of the drive wheel 14. This relative counter rotation has no effect on the motion of the drive wheel 14 since the sprocket 26 is arranged to free-wheel unless the sprocket 26 is moving forward relative to the hub 68.

In use an individual using the bicycle 12 with the velocipede drive 10 sits on the seat 18 with one foot on the ground beside the bicycle 12 and the other foot on one of the foot pedals 24 of the velocipede drive 10 and with his/her hands on the handlebars 54. The individual then applies a forwardly directed force to the slider 22 through the foot pedals 24 causing the slider 22 to move from the rearwardmost position 100 to the forwardmost position 101 drawing the first end 112 of the chain 28 along with the slider 22 towards the forwardmost position 101. This causes the chain 28 to be drawn over the sprocket 26 engaging the teeth of the sprocket 26 and causing the sprocket 26 to rotate in the first direction. At the same time the first end of the elastic member 32 is drawn rearwards thereby stretching the elastic member 32 and applying a tensioning force to the chain 28 opposite to the direction of the force applied by the sliding member 22. Rotating the sprocket 26 in the first forward direction applies a forward rotation to the drive wheel 14 which in turn causes the bicycle 12 to start moving in a forward direction.

The individual riding the bike 12 then draws his/her foot on the pedal 24 rearwards removing the forwardly directed force from the pedal 24 and applying a rearwardly directed force to the heel engagement member 108 on the back of the slider 24. The elastic member 32 now applies a forwardly directed force on the second end 114 of the chain 28 causing a rearwardly directed force to be applied at the first end 112 of the chain 28 and helping to draw the slider 22 rearwards.

As the bicycle 12 begins to move forward the individual lifts his/her other foot off of the ground and places it on the other pedal 24. A forwardly directed force is then applied to the pedals 24 with both feet. This imparts further forward rotation to the sprocket 26 and thus to the drive wheel 14 causing further forward motion of the bicycle 12. This process is repeated allowing the individual to ride the bicycle 12 to the desired location.

Although a bicycle chain 28 and sprocket 26 are used in this embodiment other alternative embodiments may include substitute elongate flexible drive members and rotatably mounted driven members for imparting a rotation to the hub of the drive wheel. An example of which is a cable and spring biased drum mechanism arranged for imparting a rotation to the drive wheel 14.

FIGS. 8 to 11 show an alternative embodiment of the velocipede drive 10. The alternative embodiment includes a drive alignment means 120 which allows for more efficient and easier steering of the bicycle 12. In the alternative embodiment a modified slider guide 122 and slider 124 are arranged to accommodate the alignment means 120 and replace those described above.

The slider guide 122 comprises a pair of elongate rails 126 fixed to the frame 34 of the bicycle 12. The rails 126 are arranged to lie substantially parallel to one another and in a substantially horizontal plane extending forwards from the frame 34 and past the front wheel 14 of the bicycle 12. The rails 126 are spaced apart to receive the front wheel 14 and forks 56 of the bicycle 12 therebetween.

Each rail 126 comprises a U shaped channel fixed at the base 128 of the U to the frame 34 of the bicycle 12 and extends along the length of the bicycle 12 from adjacent the axle 132 of the rear wheel 36 to in front of the front wheel 14. A hole 136 in each rail 126 extends through the base 128 of the U channel at a position opposite the axle 132 of the rear wheel 36 and receives the axle 132. A nut 138 or other fastener arranged for engaging the end of the axle 132 fixes each rail 126 in place on the rear axle 132. Each U channel also includes a pair of arms 154 extending laterally away from the frame 34 of the bicycle 12. The arms 154 each have a lip 156 for engaging the slider 124 projecting in towards a centre line extending through the U channel.

Each rail 126 is held in place near its front end 139 by a slot 140 which receives the axle 66 of the front wheel 14. The slot 140 extends longitudinally along the guide rail 126 from a rear end 144 to a front end 146. The slot 140 is arranged to receive one end of the axle 66 of the hub 68 of the front wheel 14 of the bicycle 12. The slot 140 is sized and arranged to allow for sliding movement of end of the axle 66 between the rear end 144 and the front end 146 of the slot 140 during steering. This allows the front wheel 14 to turn independently of the slider guide 122.

A coil spring 148 or other appropriate resilient means is fixed to each guide rail 126 at a first end 150 and is fixed to a respective end of the axle 66 at a second end 152. Each coil spring 148 biases the axle 66 rearwards towards the rear end 144 of the slot 126 and thus biases the front wheel 14 towards the unturned position.

A connection member 158 comprising a plate member is arranged to extend between the front ends 160 of the rails 126 and is fixed thereto. The connection member 158 includes a slot 162 which extends vertically through the connection member 158 and laterally across the connection member 158. The slot 162 is shaped in an arc describing a portion of a circle centered near the hub 68 of the front wheel 14

The slider 124 is the same as the slider 22 described above except as described herein below. The runners 96 have been replaced by a pair of channel members 166. One channel member 166 is fixed to a bottom of each of the arm members 92 and 93 of the U shaped plate. The channel members 166 extend along each arm 92 and 93 and are arranged to receive a respective one of the rails 126 such that the channel members 166 may slide on the rails 126 between the rearwardmost position and the forwardmost position.

Each channel member 166 is a U channel having a base 168 and a pair of arms 170. An upper one of the arms 170 of the channel member 166 is fixed to the bottom of the slider 122 such that arms 170 extend laterally inwards towards the bicycle 12. The channel members 166 are spaced a distance apart such that the arms 170 of the channel members 166 engage between the arms 154 of the rails 126 with an upper one of the arms 170 of the channel member 166 of the slider 122 lying on top of an upper one of the arms 154 of the rails 126.

The slider 124 includes a slot 172 which extends vertically through the base 168 U-shaped plate member of the slider 124 and laterally across the base 168 of the slider 124. The slot 172 is shaped in an arc describing a portion of a circle centered near the hub 68 of the front wheel 14.

The drive alignment means 120 maintain the alignment of the rotatable driven member 26, the elongate drive member 28, and the resilient member 32 when steering the front wheel 14, and allows for turning of the front wheel 14 independently of the slider guide 122 and slider 124. The drive alignment means 120 comprise an elongate alignment member 180 mounted on the steering fork 56 adjacent the rotatable driven member 26 for movement on the fork 56 during steering. The alignment member 180 has a first end 182 fixed to the fork 56 and a second end 184 extending forwards past the front wheel 14. The alignment member 180 is arranged adjacent to and aligned with the rotatable driven member 26.

The elongate flexible drive member 28 is slidably connected at the first end 112 to the alignment member 180 and the slider 124 and extends rearwardly therefrom over and around the driven member 26 to its second end 114 lying at a position in front of the driven member 26. The biasing means 32 is connected at its first end 116 to the second end 114 of the driven member 26 and at its second end 118 to the second end 184 of the alignment member 180 such that the resilient member 32 biases the slider 124 towards the rearwardmost position. This allows the alignment member 180 to follow the forks 56 of the bicycle 12 and the rotatable driven member 26 when steering the front wheel 14 of the bicycle 12 and maintain the alignment of the rotatable driven member 26, drive member 28, and resilient member 32.

The alignment member 180 extends over the slider 122 and between the slider guide rails 126 and extends forwards of the forks 56 of the bicycle 12 to its second end 184 positioned above and aligned with the slider guide connection member 158. The alignment member 180 includes a slot 190 extending vertically through and longitudinally along the alignment member 180. The slot 190 extends from a position spaced from the second end 184 of the alignment member 180 to a position adjacent the second end 184. The slot 190 is sized and arranged such that a portion of the slot 190 lies over a portion of the slot 172 in the slider 124 as the slider 124 moves between the rearwardmost position and the forwardmost position both when the front wheel 14 is positioned for straight ahead movement and when the front wheel 14 is being turned.

The elongate flexible drive member 28 is slidably connected to the alignment member 180 and to the slider 124 by a drive pin 192. The drive pin 192 has first end 194 and a second end 196 and extends through the slot 190 in the alignment member 180 and the slot 172 in the slider 124. The drive pin 192 is slidably arranged for movement within the slots 172 and 190 and is retained within the slots 172 and 190 by a flange at the first end 194 arranged above the slots 172 and 190. The drive pin 192 is fixed at the second end 196 below the slider 124 to the first end 112 of the elongate driven member 28.

A connection pin 198 is fixed to the second end 184 of the alignment member 180 and extends downwards through the slot 162 in the connection plate 158. The connection pin 198 has a first end 200 and a second end 202 and is fixed at the first end 200 to the second end 184 of the alignment member 180. The second end 117 of the resilient member 32 is fixed to the second end 202 of the connection pin 198 below the connection member 158 and thereby to the second end of the alignment member 180.

When the front wheel 14 of the bicycle 12 is positioned for straight ahead movement the drive pin 192 lies at a substantially central position within the slot 172 in the slider 124. The connection pin 198 at the second end of the alignment member 180 lies at a substantially central position within the slot 162 in the connection plate 158. The drive member 28 and resilient member 32 are thus aligned since the drive pin 172 and connection pin 198 are aligned on the alignment member 180. As the slider 124 moves between the rearwardmost position and the forwardmost position the drive pin 192 is engaged by the sides 204 of the slot 172 causing it to slide along the length of the slot 190 in the alignment member 180.

When the front wheel 14 of the bicycle 12 is positioned for turning the alignment member 180 turns with the wheel 14, and drive pin 192 slides laterally within the slot 172 in the slider 124. The connection pin 198 like the drive pin also slides laterally within the slot 162 in the connection plate 158 keeping the drive member 28 and resilient member 32 aligned. This allows for turning of the front wheel 14 without interference between the slider guide 122 and slider 124. As the slider 124 moves between the rearwardmost position and the forwardmost position the drive pin 192 continues to be engaged by the sides 204 of the slot 172 causing it to continue to slide along the length of the slot 190 in the alignment member 180.

The velocipede drive 10 although described in this embodiment as being used with a bicycle 12 may be used with other vehicles such as tricycles, human powered automobiles, boats and aircraft.

While one embodiment of the present invention has been described in the foregoing, it is to be understood that other embodiments are possible within the scope of the invention. The invention is to be considered limited solely by the scope of the appended claims.

I claim:

1. A bicycle comprising:
   a frame having a steering fork pivotally mounted on a front end;
   a rear wheel mounted on a rear end of the frame;
   a front drive wheel mounted on the steering fork and having a hub extending axially therefrom;
   a seat mounted on the frame and arranged to support a person;
   a slider guide mounted adjacent a bottom end of the steering fork and extending forwards thereof;
   a slider mounted on the slider guide for sliding movement thereon between a rearwardmost position and a forwardmost position;

foot pedals fixed to the slider for movement therewith, a rotatable driven member;

an elongate drive member being fixed to the slider for movement therewith and extending over at least a portion of an outer surface of the driven member such that contact between the elongate drive member and the driven member causes rotational movement of the driven member in response to translation of the drive member, said rotational movement being in a first rotational direction when the elongate flexible drive member moves from a retracted position with the slider means in the rearwardmost position to an extended position with the slider means in a forwardmost position, and said rotational movement being in a second direction opposite to the first direction when the elongate drive member moves from the extended position to the retracted position;

biasing means for biasing the elongate flexible member towards the retracted position;

a one-way clutch coupling the hub to the driven member for rotating the hub in response to rotation of the driven member in the first direction, and allowing the hub to free wheel in response to rotation of the driven member in the second direction;

whereby applying a forward force to the foot pedals with the legs moves the slider from the rearwardmost position to the forwardmost position thus moving the elongate drive member from the retracted position to the extended position and rotating the output member;

and whereby movement of the slider from the forwardmost position to the rearwardmost position moves the elongate flexible drive member from the extended position to the retracted position.

2. A bicycle according to claim 1 wherein the slider guide comprises:

a pair of elongate plate members arranged to lie substantially parallel to each other and in a substantially horizontal plane, said plate members being spaced apart to receive the front wheel and steering fork of the bicycle therebetween and arranged such that each plate member is fixed to a respective side of the fork adjacent a bottom end of the fork;

a slot shaped channel extending longitudinally along each of the elongate plate members;

a connection member extending between a front end of each of the elongate plate members and being fixed thereto;

an inner face plate extending downwards from and along opposed sides of the pair of elongate plate members; and a first hole through each inner face plate arranged near a rear end of each inner face plate such that the first holes are aligned with each other and cooperate to receive an elongate axle of the hub of the front wheel of the bicycle therethrough thereby mounting the slider guide member on the front wheel of the bicycle.

3. A bicycle according to claim 2 including a slider guide support connected at a first end to the bicycle frame and at a second end to the slider guide.

4. A bicycle according to claim 2 wherein the slider comprises:

a substantially U-shaped plate member being arranged in a substantially horizontal plane and having two elongate arms spaced apart from one another, and arranged to align vertically with a respective one of the elongate plate members of the slider guide, and a base extending between a front end of each arm;

at least one runner member extending downwards from each of the elongate arm members for engaging within a respective slot shaped channel of the slider guide such that the at least one runner member may slide along the slot between the rearwardmost position and the forwardmost position.

5. A bicycle according to claim 2 wherein the driven member is a sprocket mounted on the hub of the front wheel of the bicycle.

6. A bicycle according to claim 5 wherein one of the elongate plate members of the slider guide is arranged over the sprocket and includes an end plate arranged at a rear end thereof arranged such that the rear end plate extends down below the sprocket providing a guard for the sprocket, and an end plate arranged at a front end thereof such that the front end plate extends downwards therefrom providing a mounting point for the biasing means.

7. A bicycle according to claim 6 wherein the elongate flexible drive member comprises a bicycle type chain fixed at a first end to a bottom surface of the slider and extends rearwardly therefrom over and around the sprocket to a second end at a position in front of the sprocket.

8. A bicycle according to claim 7 wherein the biasing means comprise a resilient member connected at a first end to the second end of the bicycle chain and extending therefrom to a second end, said second end being connected to the front end plate of the slider guide, such that the biasing means bias the slider towards the rearwardmost position.

9. A bicycle according to claim 8 wherein resilient member is an elastic cord.

10. A bicycle according to claim 1 wherein the seat is arranged such that a person sitting in the seat has buttocks positioned slightly above the hub of the front wheel and the slider, and has legs extending substantially horizontally forwards to the slider.

11. A bicycle according to claim 1 wherein the slider guide comprises:

a pair of elongate rails fixed to the frame of the bicycle and arranged to lie substantially parallel to one another and in a substantially horizontal plane extending forwards from the frame past the front wheel of the bicycle, said rails being spaced apart to receive the front wheel and steering fork of the bicycle therebetween;

and a connection member extending between a front end of each of the rails and being fixed thereto.

12. A bicycle according to claim 11 wherein the slider comprises:

a U-shaped plate member arranged in a substantially horizontal plane having two elongate arms spaced apart from one another, each arm being arranged to align vertically with a respective one of the rails of the slider guide, and a base extending between a front end of each arm;

and a pair of channel members one being fixed to a bottom of each arm member and extending therealong, each said channel member being arranged to receive a respective one of the rails therein such that the channel members may slide on the rails between the rearwardmost position and the forwardmost position.

13. A bicycle according to claim 12 including drive alignment means for maintaining the alignment of the rotatable driven member and the elongate drive member when steering the front wheel.

14. A bicycle according to claim 13 wherein the drive alignment means comprise an elongate alignment member mounted on one side of the steering fork for movement therewith when steering and arranged adjacent and aligned with the rotatable driven member, said alignment member having a first end fixed to said fork and a second end extending forwards therefrom;

and wherein the elongate flexible drive member includes a first end and a second end, and is slidably connected at the first end to the alignment member and slider and extends rearwardly therefrom over and around the driven member to the second end lying at a position in front of the driven member;

and wherein the biasing means comprise a resilient member having a first end and a second end, said resilient member being connected at the first end to the second end of the driven member and at the second end to the second end of the alignment member such that the resilient member biases the slider towards the rearwardmost position;

and wherein steering the front wheel of the bicycle causes the alignment member to follow the steering fork of the bicycle and the rotatable driven member thereby maintaining the alignment of the rotatable driven member, drive member, and resilient member.

15. A bicycle according to claim 14 wherein the alignment member is arranged between the slider guide rails and extends forwards of the steering fork of the bicycle to a position vertically aligned with the slider guide connection member;

and wherein the slider includes a slot extending through the base of the substantially U-shaped plate member of the slider, said slot being arranged to extend laterally across said base;

and wherein the alignment member includes a slot extending therethrough and longitudinally therealong;

and wherein the slider guide includes a slot extending through the connection member of the slider guide, said slot being arranged to extend laterally across said connection member;

and wherein the resilient member is connected to the alignment member by an connection pin having a first end and a second end, said connection pin extending through the slot in the connection member of the slider guide and being fixed at the first end to the second end of the elongate member and at the second end to the second end of the resilient member;

and wherein the elongate flexible drive member is slidably connected to the alignment member and to the slider by a drive pin having a first end and a second end and extending through the slot in the alignment member and the slot in the slider, said drive pin being slidably arranged for movement within said slots, retained within said slots by retaining means at the first end, and fixed at the second end to the first end of the elongate driven member.

16. A bicycle according to claim 14 wherein each of the guide rails includes:

a slot having a rear end and a front end and extending longitudinally along the guide rail, said slot being arranged to receive a respective end of an elongate axle of the hub of the front wheel of the bicycle, and being sized and arranged to allow for sliding movement of said end of the axle between the rear end and the front end of the slot during steering;

and a resilient means fixed to the guide rail at one end and to a respective end of the axle of the front wheel of the bicycle at the other such that the axle is biased rearwards towards the rear end of the slot.

17. A bicycle according to claim 14 wherein the driven member is a sprocket mounted on the hub of the front wheel of the bicycle.

18. A bicycle according to claim 16 wherein the elongate flexible drive member comprises a bicycle type chain and wherein the resilient member is an elastic cord.

* * * * *